United States Patent Office 2,736,749
Patented Feb. 28, 1956

2,736,749

DYE-FIXING AGENTS

Charles A. Robinson, Providence, R. I., assignor to Arnold, Hoffman & Co., Inc., Providence, R. I., a corporation of Rhode Island No Drawing. Application June 10, 1952,
Serial No. 292,741

8 Claims. (Cl. 260—564)

The present invention relates to the preparation of guanidine-formaldehyde condensation products suitable for use in improving the washfastness of substantive dyestuffs on cellulosic materials.

It is a well known fact that direct or substantive dyestuffs exhibit relatively poor fastness to washing when applied to cellulosic materials. To remedy this difficulty, numerous dye-fixing agents, including guanidine-formaldehyde condensation products, have been proposed, but, while these agents have been partially satisfactory, none has been adequate to give outstanding results under the generally accepted AATCC Wash Test No. 3.

It has now been found that by using certain specific reaction conditions, a guanidine-formaldehyde condensation product of markedly superior dye-fixing properties can be obtained. The principal object of the present invention, therefore, is the provision of a guanidine-formaldehyde condensation product which is uniquely superior to the guanidine-formaldehyde condensation products and other dye-fixatives hitherto available.

A further object of the invention is the preparation of guanidine-formaldehyde dye-fixing agents which are highly substantive and will enhance the fastness of dyeings sufficiently to withstand the most strenuous of washing conditions.

Another important object of the present invention is to provide novel procedures for producing such guanidine-formaldehyde condensation products of superior dye-fixing characteristics.

Still another object of the invention is the provision of a guanidine-formaldehyde condensation product which, in addition to providing maximum dye-fixation, offers the further advantages over prior dye-fixing agents of being readily soluble, neutral in pH, stable to storage and non-sensitive to sulfate ions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly stated, the foregoing objects are accomplished, in accordance with the present invention, by reacting an aqueous solution of guanidine and formaldehyde under mild conditions of temperature and time. The resulting reaction mixture, after neutralization with acid and solubilization by heating, may be used in the aftertreatment of previously dyed cellulosic materials in conventional manner to render substantive dyeings highly washfast.

The success of the invention resides, at least to a substantial extent, in the discovery that mild reaction conditions are essential for producing a condensation product showing maximum washfastness. More particularly, it has been found that if the reaction between guanidine and formaldehyde is effected at a temperature not greater than about 80° C., rather than at the refluxing temperatures conventionally employed, for a relatively moderate time, dependent upon the temperature employed, condensation products possessing unusually superior dye-fixing properties can be obtained. The duration of the condensation reaction varies inversely over a fairly wide range, according to the particular temperature employed. At the upper limit of about 80° C., it has been found that the reaction time should not exceed fifteen minutes in order to obtain a condensation product of optimum dye-fixing characteristics. Somewhat inferior products are obtained when the reaction is carried out at this temperature for more than fifteen minutes, e. g., one-half hour, and a poor dye-fixative is obtained if the reaction is carried out at 80° C. for an hour or more. When using temperatures below the upper limit, e. g., 20 to 35° C., the reaction must, of course, be longer than that at 80° C. to give the best products. Generally speaking, the reaction times at these lower temperatures should not be less than six hours, and excellent results have been obtained using reaction times of 20 to 24 hours at these temperatures. Such reaction times, at the relatively low temperature employed, can be viewed as being mild reaction conditions, while reaction time of an hour or so at 80° C. should be considered vigorous conditions. In short, therefore, the present invention contemplates reacting guanidine and formaldehyde at a temperature up to about 80° C. for periods of time ranging from up to fifteen minutes at 80° C. to a period of at least six hours, and preferably about twenty to twenty-four hours, at temperatures of about 20 to 35° C.

A more complete understanding of the present invention may be had by reference to the following examples of actual operations in accordance with the invention. It will be understood, however, that these examples are given only for purposes of illustration and are not to be considered as in any way limiting the scope of the invention.

Example I

This example is illustrative of a preferred procedure of carrying out the present invention.

To a solution of 38 grams (0.95 mole) of sodium hydroxide in 300 grams of water in a one liter 3-neck flask fitted with stirrer, condenser, and thermometer, there was added 95.5 grams (1.0 mole) of guanidine hydrochloride followed by 170 grams (2.1 moles) of formaldehyde solution (37% by weight). The reaction mixture was then heated at 50° C. for one hour with stirring. After adding glacial acetic acid to pH 6.5 and then as required to maintain the pH 6.5 to 7.5 while heating, the reaction mixture was refluxed for ten minutes and cooled. A total of 31 grams (0.52 mole) of glacial acetic acid was used. The clear, colorless solution weighed 637 grams.

For aftertreatment, cotton cloth, dyed with a substantive dyestuff, was treated at 170° F. for one-half hour in a bath containing about 7½% of this product (based on the weight of fabric) together with a copper compound. The thus aftertreated, dyed fabric demonstrated excellent washfastness upon exposure to the No. 3 AATCC Wash Test conditions.

Example II

In a manner similar to that described in Example I, 90 grams (0.50 mole) of guanidine carbonate was added to a solution of 44 grams (1.1 moles) of sodium hydroxide in 300 grams of water. Reaction with 162 grams (2.0 moles) of formaldehyde solution at 50° C. for one hour was followed by neutralization and solubilization as in Example I; 105 grams (1.75 moles) of glacial acetic acid was used. Aftertreatment of dyed cotton fabric with the resulting product afforded outstanding fastness to washing.

Example III

Following a procedure similar to that described in Example I, 122 grams (1.0 mole) of guanidine nitrate was added to a solution of 40 grams (1.0 mole) of sodium hydroxide in 271 grams of water. After reaction with 162 grams (2 moles) of formaldehyde solution at 50° C. for one hour, neutralization and solubilization were carried out as in Example I; 36 grams of glacial acetic acid was required.

Use of the product obtained above in the after-treatment of a dyed cotton fabric as outlined in Example I rendered the dyeing substantially washfast.

Example IV

Free guanidine was obtained by stirring 360 grams (2 moles) of guanidine carbonate in 1300 ml. of water with 800 grams (2.5 moles) of finely ground barium hydroxide hydrate until complete reaction. The mixture was filtered and the solution balanced by adding sulfuric acid until a filtered sample gave no precipitate with sulfuric acid or barium chloride.

One-eighth of this solution (219 grams containing 0.50 mole of guanidine) was allowed to react with 81 grams (1.0 mole) of formaldehyde solution at 50° C. for one hour. Neutralization and solubilization, as in Example I, took 15 grams of glacial acetic acid. The resulting product was found to markedly improve the washfastness of substantive dyeings on cellulosic fabrics, when used as an after-treatment in the manner of Example I.

Example V

Forty-eight grams (0.50 mole) of guanidine hydrochloride was added to a solution of 18 grams (0.45 mole) of sodium hydroxide in 448 grams of water in a manner similar to that described in Example I. Reaction with 81 grams (1.0 mole) of formaldehyde solution at 50° C. for three hours was followed by neutralization and solubilization as before. Aftertreatment of a cotton fabric dyed with a substantive dyestuff in the manner described in Example I, except that, in this case, twice the quantity of the solubilized product was employed, resulted in a dyeing which was substantially unaffected by exposure to No. 3 AATCC Wash Test conditions.

Example VI

An identical procedure to that described in Example IV was followed, except that the condensation reaction was carried out at 65° C. for one hour. The resulting product gave results substantially identical with those of the product of Example I.

Example VII

Following a procedure similar to that described in Example I, 95.5 grams (1.0 mole) of guanidine hydrochloride was added to a solution of 36 grams (0.90 mole) of sodium hydroxide in 302 grams of water. After reaction with 162 grams (2.0 moles) of formaldehyde solution at 50° C. for one hour, concentrated hydrochloric acid was added to pH 6.0 and then as required to maintain the pH 6 to 6.5 while heating (47 grams was used). A ten minute reflux period afforded a clear, colorless solution which, when used in the manner of Example I, rendered a substantive dyeing on cotton essentially fast to washing.

Example VIII

An identical procedure to that described in Example VII was followed, except that neutralization to pH 7 to 7.5 was accomplished with 32 grams of dilute sulfuric acid solution containing 21 grams of concentrated sulfuric acid with substantially equivalent results.

Example IX

An identical procedure to that described in Example VII was followed, except that the neutralization to pH 6 to 6.5 was accomplished using 60 grams of 80% lactic acid. Aftertreatment with this product and a copper compound resulted in a vast improvement in the washfastness of dyed cotton and viscose fabrics.

Example X

The procedure of Example I was followed, except that in place of sodium hydroxide, 62.5 grams of potassium hydroxide (U. S. P. pellets) was used and the amount of water was 267 grams. Results substantially identical to those shown in Example I were obtained.

Example XI

Following a procedure similar to that described in Example I, 95.5 grams (1.0 mole) of guanidine hydrochloride was added to a solution of 40 grams (1.0 mole) of sodium hydroxide in 298 grams of water. After reaction with 162 grams (2.0 moles) of formaldehyde solution at 50° C. for one hour, the reaction mixture was cooled and allowed to stand at 20 to 25° C. for eighteen hours. The granular-like insoluble was removed by filtration and dried at room temperature to give a product weighing 87 grams. For use, 1.0 gram of this product was dissolved in 3000 ml. of water heated to 65° C. and, when this solution was used for aftertreatment of dyed cellulosic fabrics, the fastness properties of the dyeings were improved to a remarkable degree.

Example XII

An identical procedure to that described in Example IV was followed, except that the condensation reaction was allowed to take place at 30 to 35° C. for sixteen hours. The resulting product gave results substantially identical with those of the product of Example IV.

Example XIII

Following a procedure similar to that described in Example I, 95.5 grams (1 mole) of guanidine hydrochloride was added to a solution of 38 grams (0.95 mole) of sodium hydroxide in 302 grams of water. After reaction with 170 grams (2.1 moles) of formaldehyde solution at 50° C. for one hour, 70% hydroxyacetic acid was added to a pH of 6 and then as required to maintain the pH between 6 and 6.5 while heating (56 grams of acid was used). A ten minute reflux period afforded a clear colorless solution which, when used in the manner of Example I, gave a substantially washfast substantive dyeing on cotton fabric.

Example XIV

This example is illustrative of the results obtained using a procedure wherein, in contrast to the present invention, vigorous reaction conditions are employed.

A procedure identical with that described in Example IV was followed, except that a reaction temperature of 80° C. was maintained for one hour. Substantive aftertreatment with the product thus obtained resulted in poor washfastness, compared to that obtained using the product of Example IV.

The aqueous solution of guanidine and formaldehyde used in the process of the invention can be prepared in any convenient manner. For instance, free guanidine may be dissolved in water and the desired proportion of formaldehyde, in aqueous solution, added thereto. Alternatively, the reaction mixture is obtained in the preferred manner illustrated in the preceding examples, i. e., by adding aqueous formaldehyde to an aqueous solution of guanidine prepared by reacting a guanidine salt, such as the hydrochloride, nitrate or carbonate, with an approximately equivalent amount of a base stronger than guanidine, e. g., sodium or potassium hydroxide or with a compound, such as barium or calcium hydroxide, which reacts to form an insoluble salt capable of being separated from the guanidine solution.

Formaldehyde as such or in the form of its polymers, such as paraformaldehyde, may be used for reaction with the guanidine, in accordance with the present invention. Generally speaking, the amount of formaldehyde utilized is between 1.5 and 3.5 moles per mole of guanidine, although, preferably, there is employed from 1.8 to 2.5 moles of formaldehyde for each mole of guanidine.

After effecting reaction between the guanidine and formaldehyde, the resulting condensation product may be solubilized and, thereafter, applied to dyed cellulosic materials in any conventional fashion. Normally, solubilization is accomplished by adding to the reaction mixture an appropriate acid, such as formic, acetic, lactic, hydrochloric, sulfuric, or hydroxyacetic, the last being preferred, to a pH of about 5 to 9, and preferably to a pH on the acid side of the stated range. After addition of the acid, the reaction mixture is refluxed until the condensation product is dissolved and a clear, colorless solution is obtained. This solution may then be used as an aftertreatment for dyed cellulosic fabric at a concentration of about 1% (calculated as organic solids on the weight of cloth) preferably in conjunction with known copper compounds. Alternatively, rather than neutralizing the reaction mixture and dissolving the condensation product, the latter may be recovered in solid form from the reaction mixture by filtration, thereafter dried and then dissolved in hot water for use in aftertreating dyed cellulosic materials in the manner above described. In either case, the washfastness of dyeings treated with the condensation products of the invention is remarkably superior to the washfastness of dyeings treated with the previously available dye-fixatives.

It will be appreciated that the foregoing description has been given only for purposes of explanation and that variations may be made in the procedures described without in any way deviating from the scope of the invention as outlined in the appended claims.

I claim:

1. A process for the production of guanidine-formaldehyde condensation products which comprises heating an aqueous reaction mixture of guanidine and formaldehyde at a temperature between about 20 and 80° C. for a period of time ranging from up to fifteen minutes at 80° C. to at least six hours at 20° C., the reaction time varying inversely with the reaction temperature and having a maximum of about 24 hours at 20° C., said reaction mixture containing from 1.5 to 3.5 moles of formaldehyde per mole of guanidine and terminating said reaction of guanidine and formaldehyde upon the expiration of the said reaction time.

2. The process of claim 1, wherein the reaction mixture contains from 1.8 to 2.5 moles of formaldehyde per mole of guanidine.

3. A process for the production of guanidine-formaldehyde condensation products which comprises heating an aqueous reaction mixture containing guanidine and formaldehyde, in proportions of between 1.5 and 3.5 moles of formaldehyde for each mole of guanidine, at a temperature between 20 and 80° C. for a period of time ranging from up to fifteen minutes at 80° C. to at least six hours at 20° C., the reaction time varying inversely with the reaction temperature and having a maximum of about 24 hours at 20° C., thereafter neutralizing said reaction mixture by addition of acid thereto to a pH of between 5 and 9 and heating said reaction mixture until a clear solution is obtained.

4. The process of claim 3, wherein the acid added is hydroxyacetic acid.

5. A process for the production of guanidine-formaldehyde condensation products which comprises heating an aqueous reaction mixture containing guanidine and formaldehyde, in proportions of between 1.5 and 3.5 moles of formaldehyde for each mole of guanidine, at a temperature between 20 and 80° C. for a period of time ranging from up to fifteen minutes at 80° C. to at least six hours at 20° C., the reaction time varying inversely with the reaction temperature and having a maximum of about 24 hours at 20° C., and separating the resulting solid condensation product from said reaction mixture.

6. A process for the production of guanidine-formaldehyde condensation products which comprises heating at 50° C. for about an hour an aqueous reaction mixture containing guanidine and formaldehyde in proportions of between 1.8 and 2.5 moles of formaldehyde for each mole of guanidine, there being present in said mixture at least one gram of guanidine per 10 grams of reaction mixture, whereupon a solid guanidine-formaldehyde condensation product is obtained, thereafter neutralizing said reaction mixture by the addition of acid thereto to a pH of between 5 and 9 and heating said reaction mixture while maintaining the pH thereof within the range of 5 and 9 until the condensation product is dissolved and a clear solution obtained.

7. The process of claim 6, wherein said acid is hydroxyacetic acid and the reaction mixture is heated for a period of about 10 minutes.

8. The guanidine-formaldehyde condensation products obtained by the process of claim 1, said products being characterized by improved dye-fixing characteristics.

References Cited in the file of this patent

UNITED STATES PATENTS

| | | |
|---|---|---|
| 1,780,636 | Stine | Nov. 4, 1930 |
| 2,093,651 | Widmer et al. | Sept. 21, 1937 |
| 2,123,152 | Rivat | July 5, 1938 |
| 2,123,153 | Rivat | July 5, 1938 |
| 2,145,011 | Landolt | Jan. 24, 1939 |
| 2,234,905 | Tallis | Mar. 11, 1941 |
| 2,281,559 | De'Alelio | May 5, 1942 |
| 2,281,879 | Joyne | May 5, 1942 |
| 2,288,695 | Fuller | July 7, 1942 |
| 2,322,333 | Widmer et al. | June 22, 1943 |
| 2,362,915 | MacGregor | Nov. 14, 1944 |
| 2,458,397 | MacGregor | Jan. 4, 1949 |
| 2,462,428 | Roesti | Feb. 22, 1949 |

FOREIGN PATENTS

| | | |
|---|---|---|
| 429,209 | Great Britain | May 27, 1935 |
| 435,871 | Great Britain | Oct. 1, 1935 |